Patented Mar. 19, 1940

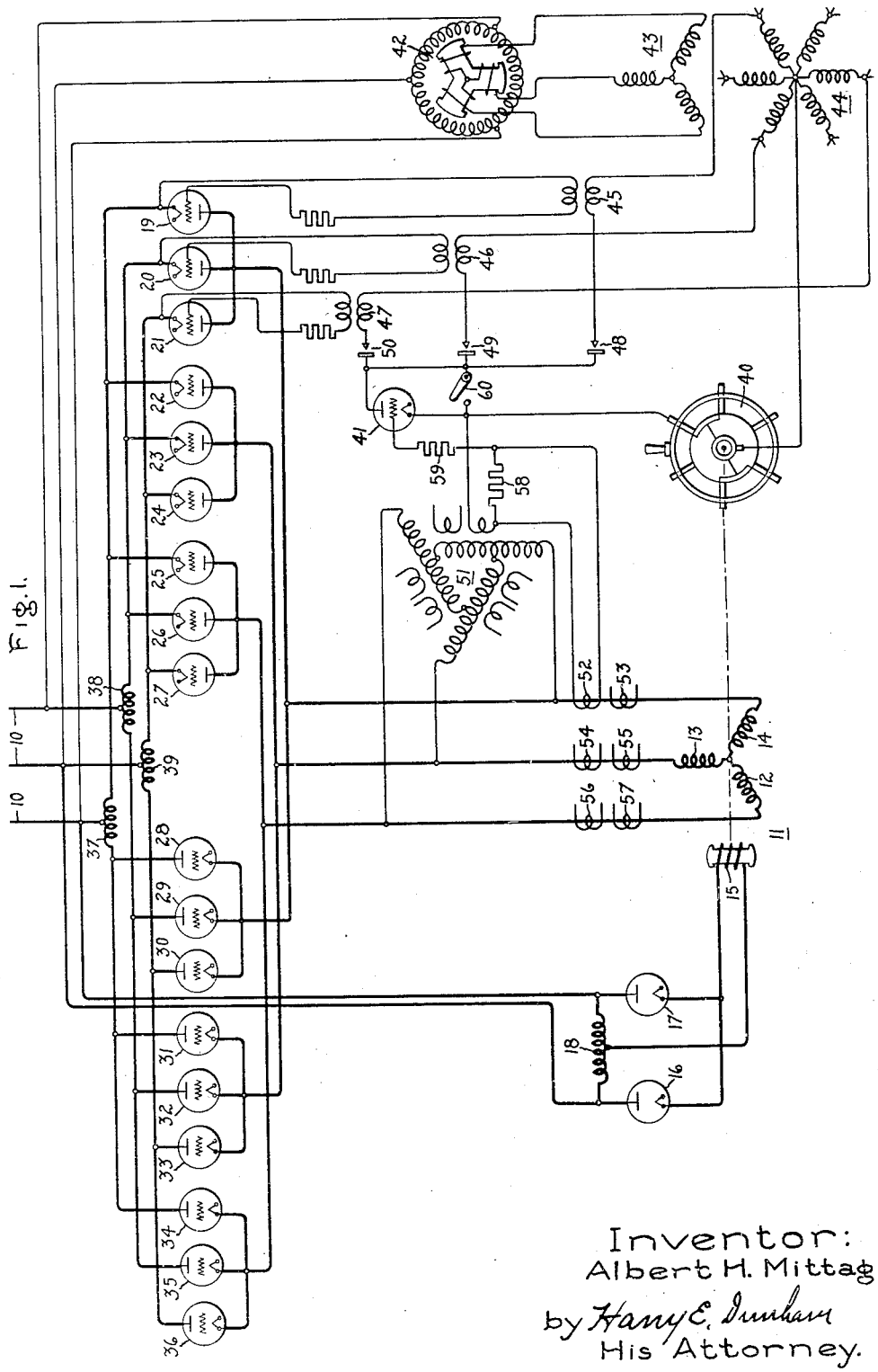

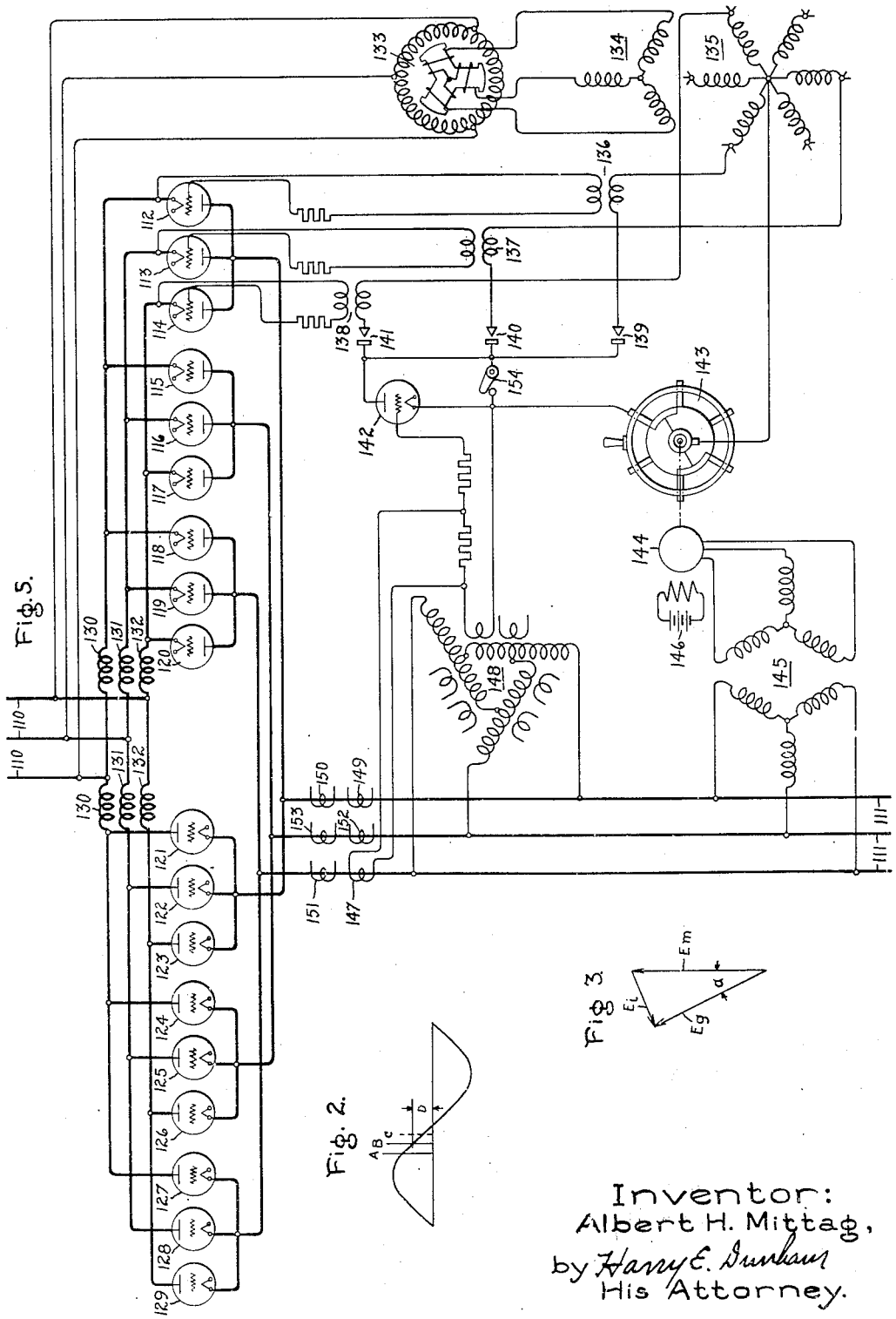

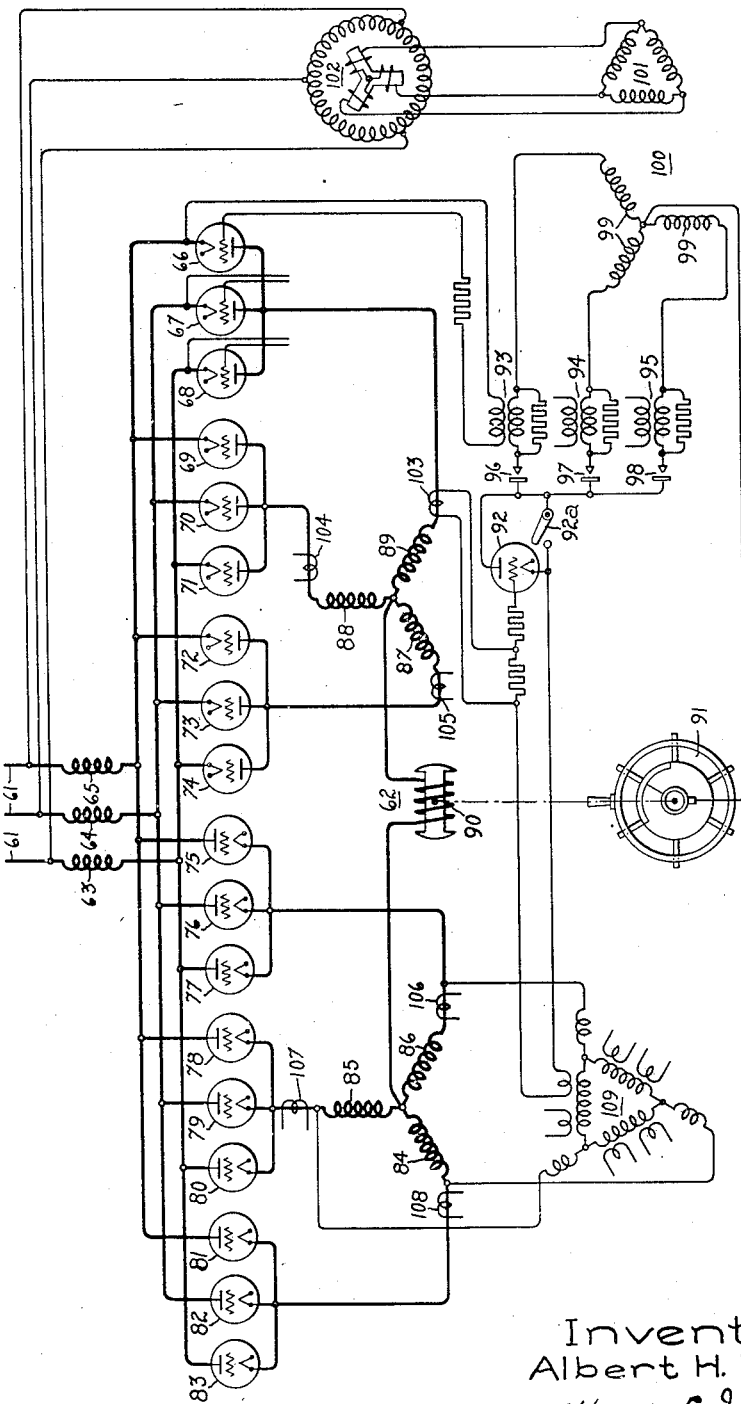

2,193,933

UNITED STATES PATENT OFFICE 2,193,933

ELECTRIC VALVE CONVERTING SYSTEM

Albert H. Mittag, Schenectady, N. Y., assignor to General Electric Company, a corporation of New York Original application February 17, 1938, Serial No. 191,046. Divided and this application November 30, 1938, Serial No. 243,176

5 Claims. (Cl. 172—281)

My invention relates to electric valve converting systems and more particularly to such systems suitable for transmitting energy between alternating current circuits of different frequencies.

This application is a division of my copending application Serial No. 191,046, filed February 17, 1938, entitled Electric valve converting system, and assigned to the assignee of the present application.

Heretofore numerous electric valve converting systems have been utilized for the transfer of energy between alternating current circuits of different frequencies and numerous arrangements have been proposed for controlling electric valve converting systems in accordance with the voltage and current conditions of the output circuit. Such arrangements, however, in many instances have involved complicated auxiliary apparatus and obviously it is desirable to obtain a system in which such control could be obtained with a minimum amount of auxiliary apparatus. Where such electric valve converting systems have been utilized to control the speed of a motor or dynamo-electric machine it is desirable to obtain a relatively flat load speed characteristic and this may be obtained by controlling the converter in accordance with the voltage and current conditions of the motor. In accordance with my invention I compensate for the field distortion of the machine as the load increases by advancing the moments of ignition of the valves of the converter thereby obtaining a relatively flat speed torque characteristic of the motor.

It is therefore an object of my invention to provide an improved electric valve converting system utilizing a minimum of auxiliary apparatus.

It is a still further object of my invention to provide an improved electric valve converting system for transferring energy between alternating current circuits of different frequencies in which the apparatus is controlled in accordance with the voltage and current conditions of the output circuit.

It is a still further object of my invention to provide an improved electric valve converting system for transferring energy between an alternating current circuit and a dynamo-electric machine in which the moments of ignition of the electric valves are advanced in accordance with increasing load upon the motor or dynamo-electric machine.

The novel features which are believed to be characteristic of this invention are set forth with particularity in the appended claims. My invention itself, however, both as to its organization and method of operation, together with further objects and advantages thereof, will be better understood by reference to the following description taken in connection with the accompanying drawings in which Fig. 1 represents one embodiment of my invention wherein an electric valve converting system supplies energy to an alternating current machine of the synchronous type; Figs. 2 and 3 are explanatory of the operation of my invention; Fig. 4 is a further modification of my invention in which an electric valve converting system supplies energy to an alternating current machine of the synchronous type; and Fig. 5 shows how my invention may be utilized in connection with an electric valve converting system for transmitting energy between two different alternating current circuits.

Referring now more particularly to Fig. 1 of the drawings, there is illustrated an arrangement embodying my invention for transferring energy between a polyphase alternating current circuit 10 and a synchronous alternating current motor 11. A dynamo-electric machine or motor 11 has been shown as comprising a plurality of phase windings 12, 13 and 14, and a rotatable field winding 15. The rotatable field winding 15 may be supplied by any suitable source of direct current or may be energized from a rectifier apparatus comprising a pair of valves 16 and 17 and an inductive winding 18. This winding 18 is energized from one phase of the alternating current circuit 10. The electric valve converting apparatus utilizes six groups of three tubes each, 19, 20, 21; 22, 23, 24; 25, 26, 27; 28, 29, 30; 31, 32, 33; and 34, 35, 36. The cathodes of the valves 19, 22 and 25 and the anodes of the valves 28, 31 and 34 are connected through an inductive winding 37 to one of the conductors of the alternating current circuit 10. The cathodes of the valves 20, 23 and 26 and the anodes of the valves 29, 32 and 35 are connected through another inductive winding 38 to one of the other conductors of the polyphase alternating current circuit 10, and similarly the cathodes of the valves 21, 24, and 27 and the anodes of the valves 30, 33 and 36 are connected through an inductive winding 39 to the remaining conductor of the polyphase alternating current circuit 10. The anodes of the group of valves 19, 20, 21 and the cathodes of the group of valves 28, 29, 30 are connected to the phase winding 14 of the motor 11. The anodes of the group of valves 22, 23, 24 and the cathodes of the group of valves 31, 32, 33 are connected to the phase winding 13 of the electric motor and the anodes of the group of valves 25, 26, 27 and the cathodes of the group of valves 34, 35, 36 are connected to the phase winding 12 of the electric motor.

In order to control the conductivities of the several electric valves that supply current successively to the several phase windings of the synchronous machine 11, the control electrodes or grids of the several groups of electric valves are adapted to be selectively excited by means of a distributor 40 which is mounted on the shaft of the machine 11 and six auxiliary electric valves one of which is shown as valve 41. The distributor 40 is provided with six brushes each of which is connected to a valve similar to valve 41. The valve 41 and each valve similar thereto controls three control transformers for a group of valves much as valves 19, 20, 21. Alternating current obtained from the source 10 is transmitted through a suitable phase shifting device such as 42 to a transformer having primary winding 43 and secondary winding 44. Three of the phase windings of the secondary winding 44 are connected to the control transformers 45, 46, 47, respectively and these transformers are connected through unilaterally conductive devices of contact rectifiers 48, 49, 50, respectively, to the anode of the auxiliary valve 41, the cathode of which is connected to one of the brushes of the distributor 40, the distributor segment of which in turn is connected to the neutral point of the phase windings of the secondary winding group 44. Each of the control circuits for the valves may include a suitable source of biasing potential (not shown) and a current limiting resistor. The auxiliary valve 41 is provided with a control circuit which is responsive to the voltage and current condition of the phase winding of the synchronous machine 11. The transformer 51 is provided with primary windings which are connected so as to be energized in accordance with the voltage appearing across the terminals of the phase windings 12, 13, 14 of the synchronous machine 11. The secondary windings of the transformer 51 are six in number corresponding to the number of auxiliary valves similar to valve 41. Two current transformers 52 and 53 are connected to the conductor supplying energy to the phase winding 14 of the motor and current transformers 54, 55 and 56, 57 respectively are connected to the conductor supplying energy to the phase windings 13 and 12 of the machine 11. One of these current transformer windings 52 is connected in series with one of the secondary windings of the transformer 51 in the control circuit for the electric valve 41 which includes the resistors 58 and 59. The electric valve 41 is therefore rendered conductive in accordance with the voltage and current conditions appearing across the phase windings of the synchronous motor 11. The distributor 40 serves to select which group of valves may be rendered conductive, the auxiliary valve such as 41 determines the instant at which one of the valves of that group will be rendered conductive, and the phase relation between the alternating current circuit 10 and the voltage supplied to the control transformers such as 45, 46 and 57 will determine which one of the valves of the group will be rendered conductive. For purposes of simplicity in disclosure the control circuits for these various valves have been shown as applied to only one group of valves comprising the valves 19, 20, 21.

It therefore will be apparent to those skilled in the art that six circuits similar to those shown in the drawings are necessary in order to provide a complete control circuit for all of the electric valves. A switch 60 is provided for each of the valves similar to valve 41 which is closed momentarily in order to start the motor and as soon as the motor begins to move the switch 60 and corresponding switches are simultaneously opened and the apparatus then begins to function in a manner which will be apparent to those skilled in the art.

In explaining the operation of the above-described apparatus, it will be assumed that initially the rotary phase shifting device 42 is so adjusted that the alternating potential impressed upon the several grid controlled circuits is retarded substantially with respect to the potential of the alternating current circuit 10 and that the rotatable field winding 15 and the distributor 40 are in approximately the positions illustrated. It further will be assumed that just prior to the positions illustrated current was conducted from the line 10 by the group of valves 31, 32, 33 through phase winding 13, phase winding 12 and through the group of valves 25, 26, 27 to the other side of the alternating current circuit 10. In the position shown in the drawings current is now being conducted by the group of valves 31, 32, 33 through phase winding 13, phase winding 14 and the group of valves 19, 20, 21. As the field winding 15 progresses still further current will be conducted by the group of valves 34, 35, 36 through phase winding 12, phase winding 14, and through the group of valves 19, 20, 21. Upon further advance of the field winding the conductivity will be as follows: From a group of valves 34, 35, 36 through phase winding 12, phase winding 13 and group of valves 22, 23, 24. From the group of valves 28, 29, 30 through phase winding 14, phase winding 13 and the group of valves 22, 23, 24. This will be followed by conduction of current by the group of valves 28, 29, 30 through phase winding 14, phase winding 12, and the group of valves 25, 26, 27. Thereafter the cycle of operation just described will be repeated.

If the valve 41 were not interposed between the distributor 40 and the various control transformers such as 45, 46 and 47, the main valves 19 to 36, inclusive, would fire at the instant B shown in the curve in Fig. 2 under light load conditions, and during heavy load conditions the instants of conductivity would move to the position C. This would result in a reduced available commutating voltage shown as D and furthermore there would be a reduction in speed of the motor 11. The introduction of the auxiliary valve such as 41 causes the motor to operate at the point B at light load and to advance the moment of ignition to point A at heavy load. This advancement of the point of ignition to point A as shown in Fig. 2 will provide a relatively flat speed torque characteristic. This advancement of the moment of ignition of the main valves 19 to 36 from point B to point A under different load conditions is accomplished by the introduction of the control impulse obtained from the current transformer 52 in the control circuit of the auxiliary valve 41. Fig. 3 shows the relation of the various voltages supplied to the control circuit of the auxiliary valve 41. Thus the voltage $E_m$ represents the voltage obtained from one of the secondary windings of the transformer 51 and the voltage $E_i$ represents the voltage component derived from the current transformer such as 52. Thus the resultant control voltage is shown as $E_a$ which has been advanced in position by an angle equal to $\alpha$. Obviously as the current flowing through the phase windings of the motor increases due to increased load the component $E_i$ will become greater thereby advancing the moment of ignition of the main valves such as 19 to 36.

While I have shown a single auxiliary valve such as 41 connected in series with each of the various brushes of the distributor 40, of course it will be apparent to those skilled in the art that a similar result could be obtained by the utilization of three auxiliary valves which would supplant the auxiliary valve 41 and the contact rectifiers or unilaterally conductive devices 48, 49 and 50.

In Fig. 4 there is shown an arrangement for transmitting current from the alternating current source 61 to a series excited synchronous type dynamo-electric machine 62. A plurality of reactors 63, 64, 65 are connected between the alternating current source 61 and the various electric valves of the converting apparatus. Six groups of three valves each are provided, 66, 67, 68; 69, 70, 71; 72, 73, 74; 75, 76, 77; 78, 79, 80; and 81, 82, 83. The cathodes of the valves 66, 69, 72 and the anodes of the valves 75, 78, 81 are connected together to one of the conductors of the polyphase alternating current circuit 61. The cathodes of the valves 67, 70, 73 and the anodes of the valves 76, 79, 82 are all connected to another one of the conductors of the alternating current supply circuit. Similarly the cathodes of the valves 68, 71, 74 and the anodes of the valves 77, 80, 83 are connected to the remaining conductor of the alternating current circuit 61. The dynamo-electric machine or motor 62 is provided with two groups of phase windings 84, 85, 86 and 87, 88, 89 and a rotatable field winding 90. The anodes of the group of valves 66, 67, 68 are connected together to one terminal of the phase winding 89; the anodes of the valves 69, 70, 71 are connected to one terminal of the phase winding 88, while the anodes of the valves 72, 73, 74 are connected to one terminal of the phase winding 87. The cathodes of the valves 75, 76, 77 are connected to one terminal of the phase winding 86; the cathodes of the valves 78, 79, 80 are connected to one terminal of the phase winding 85 and the cathodes of the valves 81, 82, 83 are connected to one terminal of the phase winding 84. The neutral point of the phase windings 84, 85, 86 is connected to one terminal of the rotatable field winding 90 and the other terminal of the field winding is connected to the neutral point of the phase winding group 87, 88, 89. Thus it is apparent that the synchronous motor shown is of the series excited type. The flow of current through the various phase winding groups comprises unidirectional current impulses so that the current flow through the rotatable field winding 90 is substantially of direct current nature.

The electric valves 66 to 83 are controlled by a control circuit which includes a distributor 91 mounted on the shaft of the machine 62 and a plurality of auxiliary electric valves such as 92. Six valves similar to valve 92 are provided, one for each of the brushes of the distributor 91, and each of these valves controls the energization of one of the six groups of main valves by means of three control transformers 93, 94, 95 and three unilaterally conductive devices 96, 97, 98. Each of the primary windings of the three transformers 93, 94, 95 is connected in series with one of the phase windings 89 of the transformer 100, the primary winding 101 of which is connected to be energized through a suitable phase shifting device 102 from the alternating current source 61. The transformer 100 may be provided with six groups of secondary windings similar to the groups 89, each group serving one or the other of the electric valves similar to the valve 92. Each of the conductors leading to the various phase windings 89, 88, 87, 86, 85, 84 of the synchronous motor 62 is provided with a current transformer 103, 104, 105, 106, 107, 108, respectively, one of which is included in the control circuit for the auxiliary valves such as valve 92. The control circuit for the valve 92 therefore includes one of the current transformers such as 103 and one of the secondary windings of the transformer 109 the primary winding of which is connected across the terminals of one of the phase groups of the synchronous motor 62 such as the phase group 84, 85, 86. Thus the electric valve 92 is rendered conductive in accordance with the voltage and current conditions of the phase windings of the synchronous machine 62. The valves 66 to 83 are therefore controlled in a manner similar to the control of the valves shown and described in connection with Fig. 1, that is, under light load conditions the moment of ignition of the main valve is primarily determined by the voltage component supplied by the secondary winding of the transformer 109 and as the load increases on the motor the voltage component supplied by the current transformer 103 serves to advance the angle of the moment of ignition of the valve 92 with a corresponding advance in the moments of ignition of the valve controlled by the auxiliary valve. For the purpose of starting the converting apparatus a suitable switch such as switch 92a is provided for each of the auxiliary valves corresponding to valve 92 and this is closed only during the starting operation after which it is opened.

The arrangement shown in Fig. 5 is suitable for transferring alternating current from a source of alternating current 110 to an alternating current load circuit 111 which may be of a different frequency or the same frequency having a different phase relation relative to the potential appearing across the polyphase circuit 110. This apparatus comprises six groups of three tubes each, 112, 113, 114; 115, 116, 117; 118, 119, 120; 121, 122, 123; 124, 125, 126; and 127, 128, 129. The cathodes of the valves 112, 115 and 118 are connected to one terminal of the inductor 130 and the anodes of the valves 121, 124 and 127 are connected to the other terminal of the inductor 130 the midpoint of which is connected to one of the conductors of the polyphase alternating current circuit 110. Similarly the cathodes of the valves 113, 116, and 119 are connected to one terminal of the inductor 131 and the anodes of the valves 122, 125 and 128 are connected to the other terminal of this same inductor the midpoint of which is connected to one of the conductors of the circuit 110. The cathodes of the valves 114, 117, and 120 are connected to one terminal of the inductor 132 while the anodes of the valves 123, 126 and 129 are connected to the other terminal of this inductor the midpoint of which is connected to one of the other conductors of the supply circuit 110. The anodes of the group of valves 112, 113 and 114 are connected together with the cathodes of the valves 121, 122 and 123 to one of the conductors of the alternating current output or load circuit 111. Similarly the anodes of the valves 115, 116, 117 and the cathodes of the valves 124, 125, 126 are connected together to one of the other conductors of the output or load circuit 111. The anodes of the valves 118, 119, 120 together with the cathodes of the valves 127, 128, 129 are connected together to the remaining conductor of the output circuit 111.

The various valves of the system are controlled by a circuit which includes a suitable phase shifting device 133 energized from the source of alternating current 110 and which device supplies energy to the primary winding 134 of a transformer the secondary windings 135 of which are arranged to be connected in series with the various control transformers of the individual valves. The secondary windings 135 are arranged in star relation and three of these windings are connected in series with the control transformers 136, 137 and 138 which transformers are connected through the unilaterally conductive devices 139, 140 and 141, respectively to the anode of one of a plurality of auxiliary valves such as valve 142. The cathode of valve 142 is connected to one of the brushes of a distributor 143 the rotating segment of which is connected to the neutral point of the transformer secondary winding group 135. The distributor 143 is driven by a synchronous motor 144 the various phase windings of which are energized from the output circuit 111 through a transformer 145. The field winding of the motor 144 may be energized from any suitable source of direct current such as the battery 146 or a rectifier supplied from one phase of the alternating current circuit 110. Since the synchronous machine 144 operates at a speed corresponding to the frequency of the output circuit 111, the distributor 143 will cause the various valves 112 to 129 to be rendered conductive in the proper sequence. These various valves, however, cannot be rendered conductive until the valve 142 is rendered conductive. This valve is provided with a control circuit which includes one of the current transformer windings 147 and one of the secondary windings of the transformer 148. For the purposes of simplicity only one auxiliary valve 142 has been shown, although six valves are utilized in order to provide a complete control circuit for all of the valves. The primary winding of the transformer 148 is connected to be energized in accordance with the potential appearing across the polyphase output circuit 111. Each of the other valves corresponding to valve 142 includes one of the other secondary windings of the transformer 148 and one of the current transformers 149, 150, 151, 152 and 153. In order to start the apparatus each of the auxiliary valves is provided with a starting switch such as switch 154 which is momentarily closed in order to start the valve converting apparatus. As soon as the valves have been rendered conductive the switch is opened and the valves are then rendered conductive in accordance with the normal operation of the control circuit.

As the load increases on the output circuit 111 the current component flowing through the conductor to which the current transformer 147 is connected will increase so as to increase the voltage component supplied by this transformer to the control circuit of the valve 142 thus causing the valve to become conductive earlier with the result that the moment of ignition of the main valve is correspondingly advanced. It is believed that since the operation of the control circuit of this system is similar to the control circuit shown in preceding figures it will be unnecessary to set forth the detailed operation thereof. If the valve converting system is utilized as an asynchronous tie between two alternating current systems or as a converter between two alternating current systems of different frequencies, it will be apparent to those skilled in the art that the arrangement shown upon proper adjustment can be made to operate to transfer energy in the opposite direction.

While I have illustrated my invention as embodying an arrangement for transmitting energy from a three phase source of alternating current to a three phase alternating current motor or load circuit, it will be obvious to those skilled in the art that my invention is of general application to arrangements for transmitting energy from an alternating current supply circuit of any number of phases to an alternating current motor or circuit of any number of phases.

While I have described what I at present consider the preferred embodiments of my invention, it will be obvious to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. The combination of a source of current, a load circuit, and an electric valve frequency converter interconnecting said source and said load circuit, said converter comprising a plurality of controlled electric valves, a control circuit for said valves including a source of potential connected in series with a plurality of controlled auxiliary valves, a control potential for said auxiliary valves, and means responsive to a plurality of electrical conditions of said load circuit for controlling the moment at which said control potential renders said auxiliary valves conductive.

2. In combination, a source of current, a polyphase alternating current load circuit, a plurality of controlled main electric valves for transmitting energy from said source to said load circuit, a control circuit for said valve including a source of control potential, a distributor driven in accordance with the frequency of said alternating current load circuit, a plurality of controlled auxiliary valves, said control potential source, said distributor and said auxiliary valves being connected in series, and means for controlling the conductivity of said auxiliary valves in accordance with the current and voltage conditions of each of the conductors of the polyphase alternating current load circuit.

3. In combination, a source of alternating current, a polyphase alternating current load circuit, a plurality of controlled main electric valves for transmitting energy from said source to said load circuit, a control circuit for said valves including means for obtaining potential from said source and a plurality of auxiliary electric valves for controlling the application of said potential to said valves, a control circuit for said auxiliary valves including means for deriving a potential component proportional to the potential appearing across said load circuit, and means for deriving a potential component proportional to the current flowing through each of the conductors of said load circuit.

4. In combination, a source of alternating current, an alternating current load circuit, a plurality of controlled electric valves for transmitting energy from said source to said load circuit, a control circuit for said valves including means for obtaining a potential from said source and a plurality of auxiliary electric valves for controlling the application of said potential to said valves, and a control circuit for said auxiliary valves including a source of control potential, and means responsive to increasing load upon said load circuit to advance the moment at which said auxiliary valves are rendered conductive by said control potential.

5. In combination, an alternating current input circuit, an alternating current output circuit, a plurality of controlled main electric valves for transmitting energy between said circuits, a control circuit for said valves including a source of potential and a plurality of controlled auxiliary valves connected in series with said potential, and a control circuit for said auxiliary valves including means responsive to the frequency of said output circuit and means responsive to current and voltage conditions of said output circuit for controlling the conductivities of said auxiliary valves.

ALBERT H. MITTAG.